No. 856,430. PATENTED JUNE 11, 1907.

S. B. STORER.

SYSTEM OF ELECTRICAL DISTRIBUTION.

APPLICATION FILED NOV. 23, 1904.

WITNESSES:
Fred. H. Miller
C. L. Belcher

INVENTOR
Simon B. Storer
BY
Wesley Sloan
ATTORNEY

UNITED STATES PATENT OFFICE.

SIMON B. STORER, OF SYRACUSE, NEW YORK, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

No. 856,430.     Specification of Letters Patent.     Patented June 11, 1907.

Application filed November 23, 1904. Serial No. 234,066.

*To all whom it may concern:*

Be it known that I, SIMON B. STORER, a citizen of the United States, and a resident of Syracuse, in the county of Onondaga and State of New York, have invented a new and useful Improvement in Systems of Electrical Distribution, of which the following is a specification.

My invention relates to systems of electrical distribution, and it has for its object to provide a system of distribution for alternating currents such that a multiplicity of voltages may be conveniently and economically derived from a single source of energy.

As is well known, induction motors may be operated most efficiently by means of higher voltages than those which are desirable for Nernst lamps and carbon filament lamps are generally operated at lower voltages than either motors or Nernst lamps. It follows that these different varieties of translating devices are rarely operated from the same generator, except in cases where step-down transformers are used.

My invention provides means for avoiding the use of two-winding transformers and for obtaining, at the same time, a low voltage for lighting purposes and a comparatively high voltage for general distribution or motor service from a single source of energy.

Such a system finds practical application in towns or villages and in factories where mixed lighting and power service is desired.

Figure 1:
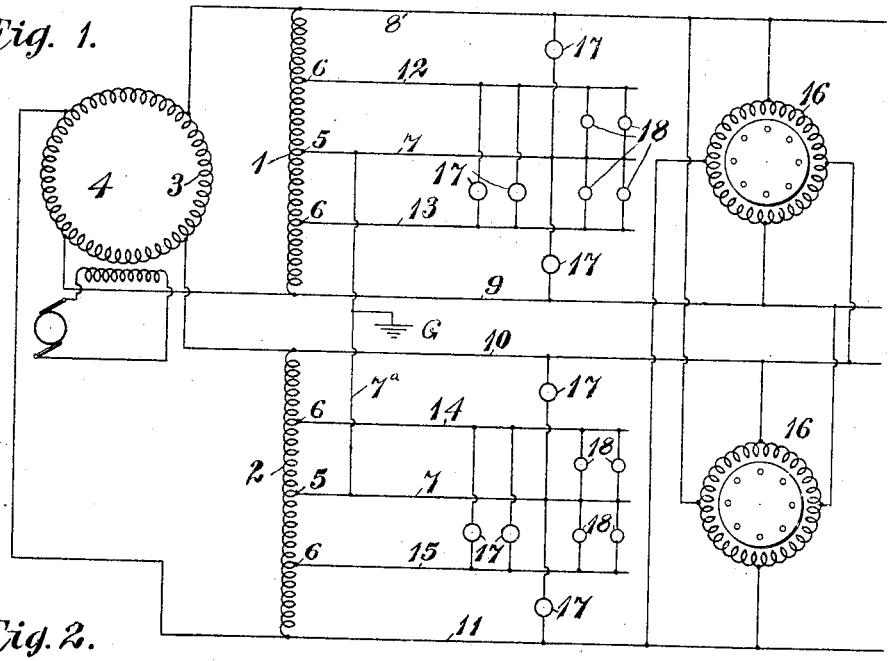
Figure 2:
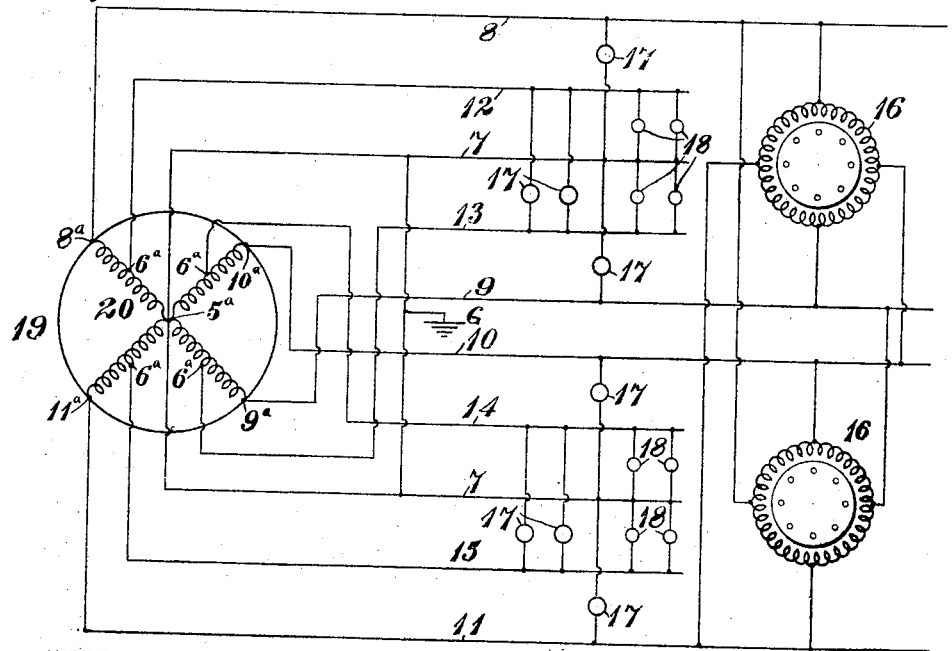

In the accompanying drawing, Figure 1 is a diagram of a system of distribution which embodies my invention, and Fig. 2 is a similar view of a modification.

Referring first to Fig. 1, auto-transformers 1 and 2 are connected to diametrically opposite points of the armature winding 3 of a two-phase generator 4, and to the middle points 5 of these transformers are connected balancing or neutral conductors 7. The conductors 7 may be connected together by means of a conductor 7$^a$ and may also be grounded, as indicated at G, in order to insure a definite, limited difference of potential between each of the other conductors and the ground. These transformers 1 and 2 may be so placed upon the spider of the armature as to revolve therewith, or the armature winding may be connected, by means of collector rings and brushes, to stationary auto-transformers.

Assuming that the generator 4 is wound to deliver 440 volts to each of the two-phase circuits, the voltage between the conductors 8 and 9 and between the conductors 10 and 11 will be that of the generator, while the voltage between any one of the conductors 8, 9, 10 and 11 and the neutral conductors 7 will be 220 volts. If taps 12, 13, 14 and 15 are taken from the middle points of the halves of the auto-transformers, the difference in potential between conductors 12 and 13 and between conductors 14 and 15 will be 220 volts, while that between each of said conductors and the grounded neutral conductor 7 will be 110 volts. Evidently, then, induction motors 16 may be operated economically from the 440 volt conductors, Nernst lamps 17 from the 220 volt conductors and carbon filament lamps 18 from the 110 volt conductors, or any other suitable arrangement of translating devices may be made.

Intermediate taps or leads other than those from the middle or neutral points of the auto-transformers may be made from any desired number of points either in lieu of or in addition to those from the points 6, as specifically indicated in the drawing. It will be readily seen that the number of such intermediate taps or leads may be varied indefinitely in order to obtain any desired range of voltages for the operation of incandescent lamps or other translating devices.

Referring now to Fig. 2 of the drawing, the conductors 8, 9, 10, 11, 12, 13, 14 and 15 and the translating devices 16, 17 and 18 may have the same arrangement and may be adapted to the same voltages and other conditions as the corresponding elements of the system illustrated in Fig. 1. In this modification, I omit the transformers and employ a generator 19 having star-connected, stationary armature windings 20 to which the distributing conductors are connected, the points 5$^a$, 6$^a$, 8$^a$, 9$^a$, 10$^a$ and 11$^a$ of such connection corresponding to the points in the transformer windings to which the conductors are connected in the system shown in Fig. 1.

It is therefore to be understood that my invention is not to be limited to any specific number of taps or leads or to the character of the translating devices employed, the voltages and translating devices which have been illustrated and described being in no sense restrictive.

I claim as my invention:

1. A system of electrical distribution comprising a two-phase generator, auto-transformers having their terminals connected to the maximum potential armature points corresponding to the respective phases and having their middle points connected together and grounded, and distributing conductors connected to the middle points, to the extremities and to points intermediate the middle points and the extremities of the auto-transformer windings.

2. A system of electrical distribution comprising a two-phase generator, auto-transformers connected to maximum potential armature points corresponding to the respective phases and having their middle points connected together and grounded, and distributing conductors respectively connected to the extremities, to the middle points and to intermediate points of the halves of said auto-transformer windings.

3. The combination with a two-phase generator and distributing conductors leading therefrom, of auto-transformers having their middle points connected together and grounded and having their extremities connected to the maximum potential armature points corresponding to the respective phases, and additional distributing conductors which are connected to the middle points and to the middle points of the halves of the auto-transformer windings.

4. A system of electrical distribution comprising a polyphase generator, auto-transformers connected to maximum potential armature points corresponding to the respective phases and having their middle points connected together and grounded, and distributing conductors respectively connected to the extremities and to a plurality of intermediate points in said auto-transformer windings.

5. A system of electrical distribution comprising a source of two-phase electrical energy, sets of translating devices adapted for different voltages, and two sets of supply conductors that are respectively connected to the middle points, the extremities and intermediate points of two-phase windings with which the said source of energy is provided, the middle points of the windings being connected together and grounded.

6. A system of electrical distribution comprising a source of polyphase electrical energy and distributing conductors that are respectively connected to the middle points, to the extremities and to intermediate points in windings with which the said source of energy is provided, the middle points of the generator windings being connected together and grounded.

In testimony whereof, I have hereunto subscribed my name this 17th day of November 1904.

SIMON B. STORER.

Witnesses:
J. C. MORSE,
BIRNEY HINES.